United States Patent

Shoji et al.

[11] Patent Number: 5,773,589
[45] Date of Patent: Jun. 30, 1998

[54] STEAM REFORMING CATALYSTS FOR LOWER HYDROCARBONS

[75] Inventors: Kazuo Shoji; Ryuichi Mogami; Toru Numaguchi, all of Chiba; Toshio Matsuhisa, Kanagawa; Hideaki Yanaru, Chiba; Yasuo Nishioka, Yamaguchi; Yasuhiro Izawa, Chiba, all of Japan

[73] Assignees: Toyo Engineering Corporation; Catalysts and Chemicals, Inc., Far East, both of Tokyo, Japan

[21] Appl. No.: 848,917

[22] Filed: May 1, 1997

[30] Foreign Application Priority Data

May 16, 1996 [JP] Japan .................................. 8-121442

[51] Int. Cl.$^6$ ............................ B01J 21/04; B01J 23/40; B01J 23/755
[52] U.S. Cl. ......................... 502/328; 502/332; 502/333; 502/334; 502/335
[58] Field of Search .................................. 502/325, 328, 502/332, 333, 334, 335, 337, 339, 439

[56] References Cited

U.S. PATENT DOCUMENTS

| | | | |
|---|---|---|---|
| 4,285,837 | 8/1981 | Sato et al. | 252/466 J |
| 4,906,603 | 3/1990 | Burgfels et al. | 502/328 |
| 4,990,481 | 2/1991 | Sato et al. | 502/335 |

FOREIGN PATENT DOCUMENTS

| | | | |
|---|---|---|---|
| 0 279 389 | 8/1988 | European Pat. Off. | C01B 3/40 |
| 4-59048 | 2/1992 | Japan | C01B 3/40 |

OTHER PUBLICATIONS

Dependence of Mechanical Strength of Britle Polycrystalline Speciments on Porosity and Grain Size by F.P. Knudsen Journal of The American Ceramic Society, vol. 42, No. 8, pp. 376–387, Aug. 1958.

*Primary Examiner*—Michael Lewis
*Assistant Examiner*—Alexander G. Ghyka
*Attorney, Agent, or Firm*—Flynn, Thiel, Boutell & Tanis, P.C.

[57] ABSTRACT

To provide an improved steam reforming catalyst for lower hydrocarbons which is highly active and has a high crushing strength. An improved steam reforming catalyst for lower hydrocarbons comprising a support constituted of CaO and $Al_2O_3$ and an active component comprising nickel or a platinum-group metal. The content of CaO is 0.5 to 25 wt% based on the catalyst, and at least part of the CaO forms compounds with the $Al_2O_3$. The support has a void fraction X of pores with a diameter of 0.5 $\mu$m to 20 $\mu$m of 0.08 or higher, a void fraction Y of pores with a diameter smaller than 0.5 $\mu$m of 0.15 or higher, and a total void fraction Z of 0.23 to 0.8 (provided that $Z \leq (X+Y)$).

6 Claims, No Drawings

STEAM REFORMING CATALYSTS FOR LOWER HYDROCARBONS

BACKGROUND OF INVENTION

The present invention relates to improved steam reforming catalysts for lower hydrocarbons.

PRIOR ARTS

One of the present inventors previously disclosed steam reforming catalysts for lower hydrocarbons such as n-hexane in US-A 4990481 and JP-A 4-59048. These catalysts had structures in which the pore volume having a pore size (diameter) of 0.1 to 0.5 µm was 0.2 ml/g or larger and that having a pore size (diameter) of 0.5 µm or larger was 0.05 ml/g or larger. The former contained nickel as the active component, while the latter contained a platinum-group metal selected among ruthenium, rhodium, platinum, and palladium. Both catalysts had high activities. Since such catalysts are formed into sized particles (hereinafter referred to as sized catalysts) and have an increased void fraction (or porosity), they have a reduced crushing strength. This fact was indicated, e.g., in F.P. Knudsen, *J. Amer, Ceram. Soc.*, 42, 376(1959). As described above, catalysts having such porous structures have the problem of low crushing strength, although they are highly active.

From the point of attaining an increased crushing strength, it is known that catalysts comprising a support which is constituted of CaO and $Al_2O_3$ and has been heated at 1,300° C. or higher have a higher crushing strength than catalysts comprising a support made of $Al_2O_3$ only and undergo no decrease in crushing strength during use.

On the other hand, it is widely known that catalysts containing an alkali component have a lower activity than catalysts containing no alkali component. Nickel catalysts comprising a support constituted of CaO and $Al_2O_3$ have a lower activity than $Al_2O_3$ supported nickel catalysts.

As described above, according to the prior arts, the catalysts comprising a support constituted of CaO and $Al_2O_3$ have a low activity, although having a high crushing strength.

SUMMARY OF INVENTION

An object of the present invention is to provide an improved steam reforming catalyst for lower hydrocarbons which eliminates the problem described above.

The present inventors conducted intensive investigations while repeating the method of trial and error in order to further improve the steam reforming catalysts for lower hydrocarbons disclosed in U.S. patent application Ser. No. 4990481 and JP-A 4-59048. As a result, they have unexpectedly found that a catalyst having a high activity and a high crushing strength can be realized by using a support which has the structure of the catalyst support disclosed in US-A 4990481 and JP-A 4-59048 and is constituted of specific components. The invention has been achieved based on this finding.

Definition of Invention

The invention provides a catalyst for steam-reforming of lower hydrocarbons, comprising a support comprising $Al_2O_3$ and 0.5 to 25 percent by weight, per the catalyst, of CaO, at least part of CaO forming a compound(s) with $Al_2O_3$, and Ni as the active component, a void fraction X of pores having a pore size of 0.5 to 20 µm being 0.08 or larger, a void fraction Y of pores having a size of less than 0.5 µm being 0.15 or larger, an entire void fraction Z of all the pores being 0.23 to 0.8, Z not being less than the sum total of X and Y.

A preferable catalyst comprises 3 to 20 percent by weight of nickel.

The invention provides another catalyst for steam-reforming of lower hydrocarbons, comprising a support comprising $Al_2O_3$ and 0.5 to 25 percent by weight, per the catalyst, of CaO, at least part of CaO forming a compound(s) with $Al_2O_3$, and at least one metal of the platinum group as the active component, a void fraction X of pores with a diameter of 0.5 to 20 microns (µm) being 0.08 or larger, a void fraction Y of pores with a diameter of less than 0.5 micron (µm) being 0.15 or larger, an entire void fraction Z of all the pores being 0.23 to 0.8, Z not being less than the sum total of X and Y.

A preferable catalyst comprises 0.2 to 5 percent by weight of the metal(s). It is preferable that the metal is selected from the group consisting of ruthenium, rhodium, palladium, osmium, iridium and platinum.

Moreover the invention provides a process for steam-reforming of hydrocarbons, preferably having 1 to 6 carbon atoms or a mixture thereof at the presence of one of the two catalyst as defined above.

In the invention, contents of CaO, nickel and a platinum group mental are defined in terms of CaO, nickel and a platinum group mental, respectively.

DESCRIPTION OF INVENTION

The present invention will now be described in detail.

The term "lower hydrocarbon" used herein refers to any of the hydrocarbons ranging in carbon number from 1 for methane to 6 for other hydrocarbons and mixtures of these.

The structure of the catalyst is described first. The structure is one of the important factors in the present invention. In general, a larger specific surface area of an active component results in a higher activity because catalytic reactions take place on the active sites of the component. For increasing the specific surface area of the active component, a support having an increased specific BET surface area should be used. The support should have meso pores with diameters smaller than 0.5 µm so as to have the increased specific BET surface area.

On the other hand, it is well known that such a catalyst has a high intraparticle diffusion resistance, because steam reforming reactions are conducted generally at temperatures as high as 600° to 850° C. The intraparticle diffusion resistance can be reduced by increasing the pore volume of macro pores with diameters of 0.5 µm or larger. Although the increased pore volume of such macro pores results in reducing the specific BET surface area, this can be compensated for by forming a structure having pores with a diameter smaller than 0.5 µm and macro pores in combination. The quantity of porosity is expressed in terms of pore volume per unit weight of the catalyst. However, in the case of catalysts which are constituted of various elements and in which the contents thereof vary as in the present invention, the expression in terms of the pore volume per unit weight of the catalyst is not appropriate because such catalysts have various densities. In industrial plants, a catalytic productivity is due to the activity of the catalyst per unit volume of the reactor. Namely, the activity expressed is not in unit weight of the catalysts, but in unit volume thereof.

Accordingly, the quantity of the pores in the present invention is expressed in terms of pore volume per unit catalyst volume (unit: cm³/cm³), that is, expressed by means of the fraction called porosity or void fraction. Hereinafter, it is referred to as the void fraction. In this connection, the pore volume with a diameter of 0.1 to 0.5 μm of 0.2 ml/g or larger in the steam reforming catalysts for lower hydrocarbons previously disclosed by the present inventors in U.S. patent application Ser. No. 4990481 and JP-A 4-59048 corresponds to a void fraction of 0.346 or higher, while the pore volume with a diameter of 0.5 μm or larger of 0.05 ml/g or larger in those catalysts corresponds to a void fraction of 0.087 or higher.

In the present invention, the support has such a structure that a void fraction X of pores with a diameter of 0.5 μm to 20 μm, a void fraction Y of pores with a diameter smaller than 0.5 μm and the total void fraction Z satisfy the relationship z≧ (X+Y), provided that X≧0.08, Y≧0.15, and 0.8≧Z≧ 0.23, desirably X≧0.10, Y≧0.20, and 0.8≧Z≧0.30, more desirably X≧0.125, Y≧0.20, and 0.8≧Z≧0.33.

If X is lower than 0.08 even when Z≧ (X+Y), the diffusion-enhancing effect of the macro pores is lessened and the effects of the present invention cannot be sufficiently produced. If Y is lower than 0.15 even when Z≧ (X+Y), the surface area of the active component of the catalyst decreases. Hence, too low values of X and Y should be avoided.

If Z is lower than 0.23, there are cases where the catalyst has an insufficient activity although having a high crushing strength. If Z exceeds 0.8, there are cases where the catalyst has an insufficient crushing strength although having a high activity. Hence, values of Z outside the above range should be avoided.

The reason why the support is limited in pore diameter is that pores having a diameter exceeding 20 μm are too large to effectively contribute to some reactions. Hence, such too large pores should be avoided.

The support is described now, first with respect to CaO and $Al_2O_3$. In the present invention, the support is constituted of CaO and $Al_2O_3$, in which at least part of the CaO forms compounds with the $Al_2O_3$. This means that the CaO and the $Al_2O_3$ are not present independently of each other. Examples of the main compounds are aluminates of CaO and $Al_2O_3$ represented by the following formula (1). It is preferable that at least 50 wt% of the CaO forms the aluminates with $Al_2O_3$.

$CaO.6Al_2O_3$+minute amount of $CaO.2Al_2O_3$ (1)

The aluminate compounds represented by the above formula used in the present invention are obtained, for example, by an ordinary method in which the so-called calcium-alumina cement, consisting of α-$Al_2O_3$ and $CaO.Al_2O_3$, aluminum hydroxide, etc. are formed into sized particles and calcined at 1,300° C. or higher. γ-$Al_2O_3$ may be used in place of aluminum hydroxide.

The content of CaO is 0.5 to 2wt %, preferably 2 to 20 wt%, based on the catalyst. If the content thereof is lower than 0.5 wt %, a reduced crushing strength results. Even if the content thereof exceeds 25 wt%, the catalyst remains unchanged in the crushing strength. But it may reduce the activity. Hence, CaO contents outside the above range should be avoided.

Now the active components will be described. In the present invention, nickel or a platinum-group metal is used as the active component. The nickel or platinum-group metal can be supported by known methods including the impregnation, deposition, coprecipitation, kneading, and ion-exchange methods, though the impregnating method may be usually used.

The catalyst containing nickel as the active component is described first. After nickel is supported on a support by impregnation in an ordinary way, the support is dried at about 120° C., and then heated at 300° to 400° C. or a further higher temperature to decompose a nitrate. Alternatively, the support dried at about 120° C. may be calcined at 750° to 950° C. for several hours.

In the present invention, the content of nickel is 3 to 20 wt % in terms of nickel based on the catalyst. If the content thereof is lower than 3 wt %, the catalyst has an insufficient activity. Even if the content thereof exceeds 20 wt %, the catalytic activity is not sufficiently enhanced. Hence, nickel contents outside the above range should be avoided.

Lastly, the catalyst containing a platinum-group metal as the active component is described. It may be obtained by supporting the active component on a support by an ordinary supporting method, naturally drying the support, subsequently forcibly drying it at 100° to 130° C., and then heating it. In the case of ruthenium, the heating temperature is preferably 200° C. or lower. For rhodium, the heating (or calcining) temperature is preferably 800° to 900° C. In the case of incorporating the other platinum-group metals, the heating (or calcining) should be conducted in an oxidizing atmosphere, e.g., air, at a temperature at which the platinum-group metals do not sublime or otherwise fly out during heating (or calcining).

The content of the platinum-group metal as the active component in the catalyst of the present invention is 0.2 to 5 wt % in terms of platinum-group metal element based on the catalyst. If the content thereof is lower than 0.2 wt %, a reduced catalytic activity results. Even if the content thereof exceeds 5 wt %, the activity remains unchanged. Hence, platinum-group metal contents outside the above range should be avoided.

The platinum-group metal is ruthenium (Ru), rhodium (Rh), palladium (Pd), osmium (Os), iridium (Ir), or platinum (Pt) or a mixture of these.

Preferred of these are ruthenium, rhodium, and platinum, in particular ruthenium. The catalyst containing ruthenium as the active component is preferred in that it has a high activity and a high crushing strength, and that it is highly prevented from suffering carbon deposition when S/C, which is defined as the molar ratio of the steam (S) to the carbon (C) fed, is low. Specifically, that catalyst containing ruthenium as the active component does not suffer the carbon deposition even when used at S/C of 1.5 as stated in JP-A 4-59048, whereas the catalyst containing nickel as the active component and that containing rhodium, platinum, or another as the active component are usually used at S/C of 2.5 or higher.

The catalysts may contain, as impurities or additives, alkali metals such as potassium, alkaline earth metals such as barium, magnesium, and strontium, Group IIIA elements of the Periodic Table such as gallium and indium, and other elements such as lanthanum, silicon, titanium, and zirconium.

A small amount of a binder, e.g., silica, may be added in the present invention in order to enhance the crushing strength in an auxiliary manner while maintaining the activity.

Technical Advantages

The improved steam reforming catalysts for lower hydrocarbons of the present invention have the following effects.

(1) Due to their increased crushing strength, the catalysts were less apt to break even under such severe conditions, for example, that the operation was repeatedly suspended and restarted, and attained a high catalytic activity.

(2) Due to their increased crushing strength, the catalysts were less apt to break even under such severe conditions, for example, that the operation was repeatedly suspended and restarted, and attained an improved productivity.

EXAMPLES

Although the present invention has been described as above, it will be detailed herein below by reference to Examples.

It is a matter of course that the invention is not limited to the following Examples only.

Example 1

A catalyst comprising a support and 7.6 wt % of nickel based on the whole catalyst was produced. The support was constituted of CaO and $\alpha$-$Al_2O_3$, with the content of CaO being 6 wt % based on the whole catalyst, and contained no free CaO detectable by X-ray diffractometry. All the CaO in the support was present as calcium aluminate compounds. The support had a void fraction Y of pores with a diameter smaller than 0.5 $\mu$m of 0.262, a void fraction X of pores with a diameter of 0.5 $\mu$m to 20 $\mu$m of 0.270, and a total void fraction Z of 0.535. (This catalyst is referred to as BS.) The catalyst was sized to have an outer diameter of 5/8 inch, a height of 3/8 inch, and an inner diameter of 1/4 inch.

Using forty pieces of the catalyst BS, the side crushing strength was first measured with a compression tester. The results obtained are given in Table 1.

The catalyst was then subjected to a reaction. The catalyst BS was packed into a reactor with an inner diameter of 24.1 mm. The temperature of the catalyst bed was elevated to 750° C., and the catalyst was reduced by introducing nitrogen and hydrogen in an $H_2/N_2$ volume ratio of 30/70 at a space velocity, $SV_0$, of 200,000 $h^{-1}$ for 20 hours. The reduced catalyst was used in a steam methane reforming reaction. Steam and methane were fed to the reactor under the reaction conditions of 600° C., 10 bar, a ratio of the molar amount, S, of the steam fed per unit time to that, C, of the carbon contained in the methane fed per unit time, in short, S/C of 3.0, and a space velocity, $SV_0$, of 200,000 $h^{-1}$. This reaction was continued. After operating for 100 hours, the activity was measured. The results obtained are given in Table 1. As is generally known, the approach temperature in Table 1 is the difference between the equilibrium temperature calculated from the composition of the outlet of the reactor and the measured temperature obtained at the outlet of the reactor; the smaller the difference, the higher the activity.

Example 2

The same procedure as in Example 1 was conducted, except that a catalyst BN1 having a nickel content of 3 wt % was used in place of the catalyst BS having a nickel content of 7.6 wt %. The results obtained are given in Table 1.

Example 3

The same procedure as in Example 2 was conducted, except that a catalyst BN2 having a nickel content of 20 wt % was used in place of the catalyst BN1 having a nickel content of 3 wt %. The results obtained are given in Table 1.

Example 4

The same procedure as in Example 1 was conducted, except that a catalyst containing not nickel but ruthenium in a concentration of 1 wt % based on the catalyst was used. The catalyst is referred to as BR. The results obtained are given in Table 1.

COMPARATIVE EXAMPLE 1

The same procedure as in Example 1 was conducted, except that the use of 6 wt % CaO was omitted and X was changed from 0.270 to 0.03. The catalyst is referred to as U. The results obtained are given in Table 1.

COMPARATIVE EXAMPLE 2

The same procedure as in Example 1 was conducted, except that the use of 6 wt % CaO was omitted . The catalyst is referred to as B. The results obtained are given in Table 1.

COMPARATIVE EXAMPLE 3

The same procedure as in Example 1 was conducted, except that X was changed from 0.270 to 0.05. The catalyst is referred to as UC. The results obtained are given in Table 1.

TABLE 1

| | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Catalyst | BS | BN1 | BN2 | BR | U | B | UC |
| Approach temperature in steam reforming of lower hydrocarbon (°C.) | 133 | 142 | 125 | 137 | 167 | 148 | 172 |
| Composition of gaseous reaction mixture (vol %) | | | | | | | |
| $H_2$ | 23.6 | 21.8 | 25.2 | 22.7 | 17.0 | 20.5 | 16.1 |
| CO | 0.3 | 0.2 | 0.3 | 0.2 | 0.1 | 0.2 | 0.1 |
| $CO_2$ | 6.3 | 5.9 | 6.7 | 6.1 | 4.8 | 5.6 | 4.6 |
| $CH_4$ | 69.8 | 72.1 | 67.8 | 71.0 | 78.1 | 73.7 | 79.2 |
| Crushing strength (kg) | 29.6 | 28.0 | 33.0 | 27.0 | 41.0 | 16.3 | 57.0 |

We claim:

1. A catalyst thereby for steam-reforming of lower hydrocarbons, comprising- a support comprising $Al_2O_3$ and 0.5 to 25 percent by weight, per the catalyst, of CaO, at least part of CaO forming a compound(s) with $Al_2O_3$, and Ni as the active component, a void fraction X of pores with a diameter of 0.5 to 20 $\mu$m being 0.08 or larger, a void fraction Y of pores with a diameter of less than 0.5 $\mu$m being 0.15 or larger, an entire void fraction Z of all the pores being 0.23 to 0.8, Z not being less than the sum total of X and Y.

2. The catalyst as claimed in claim 1, which comprises 3 to 20 percent by weight of nickel.

3. A catalyst thereby for steam-reforming of lower hydrocarbons, comprising a support comprising $Al_2O_3$ and 0.5 to 25 percent by weight, per the catalyst, of CaO, at least part of CaO forming a compound(s) with $Al_2O_3$, and at least one metal of the platinum group as the active component, a void fraction X of pores with a diameter of 0.5 to 20 $\mu$m being 0.08 or larger, a void fraction Y of pores with a diameter of less than 0.5 $\mu$m being 0.15 or larger, an entire void fraction Z of all the pores being 0.23 to 0.8, Z not being less than the sum total of X and Y.

4. The catalyst as claimed in claim 3, which comprises 0.2 to 5 percent by weight of the metal(s).

5. The catalyst as claimed in claim 3, in which the metal is selected from the group consisting of ruthenium, rhodium, palladium, osmium, iridium and platinum.

6. A process for steam-reforming of hydrocarbons having 1 to 6 carbon atoms or a mixture thereof at the presence of the catalyst as defined in claim 1.

* * * * *